(12) United States Patent
Wang

(10) Patent No.: US 7,536,500 B2
(45) Date of Patent: May 19, 2009

(54) HEADER BLOCKS FOR FLASH MEMORY WRITES

(75) Inventor: Hongyu (Jeffrey) Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 11/540,718

(22) Filed: Sep. 29, 2006

(65) Prior Publication Data

US 2008/0082727 A1     Apr. 3, 2008

(51) Int. Cl.
*G06F 12/02* (2006.01)
(52) U.S. Cl. ...................... 711/103; 711/165
(58) Field of Classification Search .......... 711/103, 711/165
See application file for complete search history.

(56) References Cited

U.S. PATENT DOCUMENTS

| 6,272,607 | B1* | 8/2001 | Baentsch et al. | 711/162 |
| 6,609,187 | B1* | 8/2003 | Merrell et al. | 711/173 |
| 6,684,289 | B1* | 1/2004 | Gonzalez et al. | 711/103 |
| 2004/0177212 | A1* | 9/2004 | Chang et al. | 711/103 |
| 2007/0083697 | A1* | 4/2007 | Birrell et al. | 711/103 |
| 2007/0100852 | A1* | 5/2007 | Wang et al. | 707/100 |

* cited by examiner

*Primary Examiner*—Shane M Thomas
(74) *Attorney, Agent, or Firm*—Lee & Hayes, PLLC

(57) ABSTRACT

Embodiments of header management for a file system of flash memory are presented herein. In one or more implementations, a data write is performed using a header block to cache a plurality of headers associated with data which is written to a data block of the flash memory. The headers are then compacted from the header block to the data block.

17 Claims, 4 Drawing Sheets

Processor Based Device 102

HEADER BLOCKS FOR FLASH MEMORY WRITES

BACKGROUND

Flash memories may have file systems which logically maps files (e.g., data) to physical memory locations. Traditionally, flash file systems have allowed bit twiddling in which multiple small data fragments (such as headers) are written directly into a sector of a data block of flash memory used for storing associated file data, such that the least number of sectors may be used for the data. Bit twiddling involves making multiple writes of small (less than the sector size) data fragments to the same sector of a data block. However, multiple writes to sectors may decrease the life span of flash memory arrays and may cause reliability issues such as corrupting or damaging the memory. Thus, to improve reliability, emerging devices and hardware may limit and/or eliminate bit twiddling for flash memory writes. One technique to handle small (less than the sector size) data fragments, without using bit twiddling, is to write these small fragments on a one to one basis to individual sectors. Because of this, however, one or more sectors of the flash memory may not be filled to capacity, which results in an inefficient use of the memory.

DETAILED DESCRIPTION

In the following discussion, header management techniques for a flash memory file system are described in which a header block is employed to write a plurality of headers associated with a data write into one or more sectors of a data block. In an implementation, the headers associated with a data write may be written into the least number of sectors (e.g. the most efficient storage), without use of bit twiddling. While illustrative embodiments of a flash memory file system are described below, those skilled in the art will appreciate that the described techniques may be employed with any suitable arrangement of a flash memory file system without departing from the spirit and scope thereof. Further, while headers are described, the techniques are equally applicable to a variety of other small sized fragments (less than sector sized) such as small file fragments, data flags, fragment status indicators, and the like.

Figure 1:
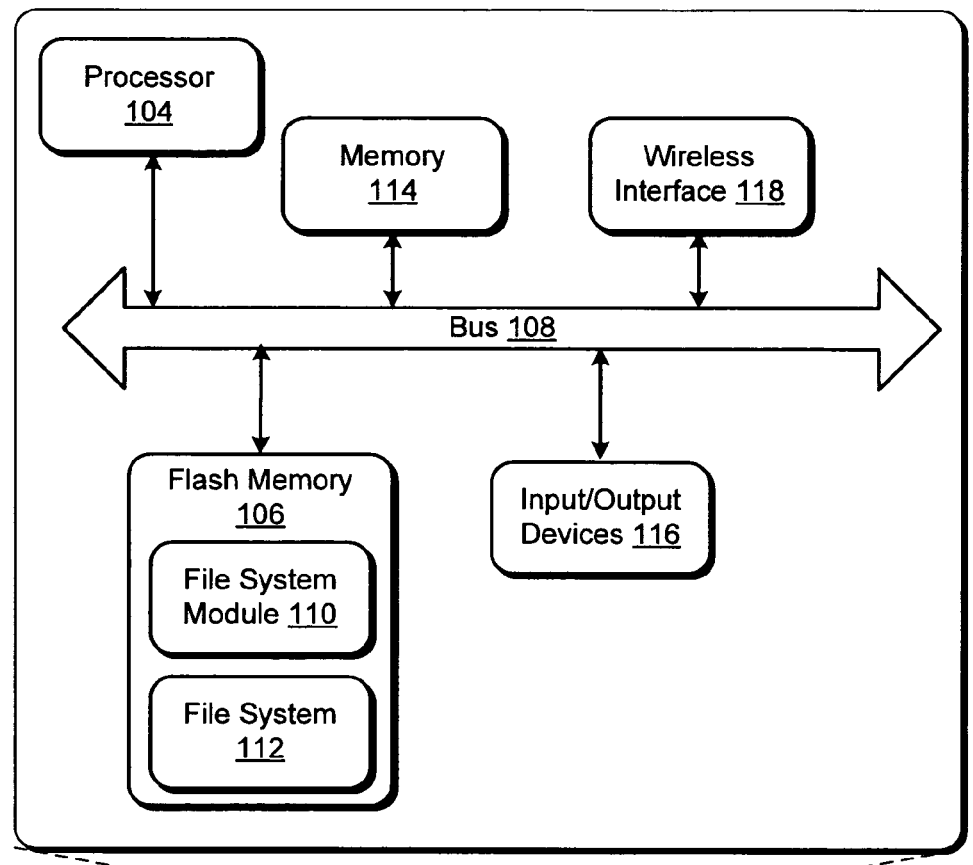
FIG. 1 depicts an exemplary electronic system which is operable to employ one or more embodiments of the header management techniques described herein.
Figure 1:
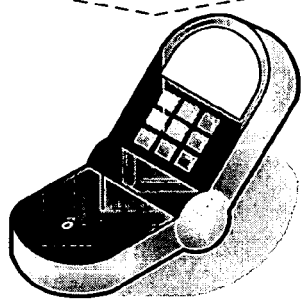

FIG. 1 depicts an exemplary electronic system 100 which is operable to employ one or more embodiments of the header management techniques described herein. System 100 illustrates a processor based device 102 which includes a processor 104 and a flash memory 106 communicatively coupled via a bus 108. A variety of processor based devices 102 are contemplated in which the described header management techniques may be performed, for example, the processor based device 102 is illustrated in FIG. 1 as a mobile phone device. In other embodiments, a variety of other processor based devices 102 having flash memory 106 may be provided including but not limited to a personal computer, a laptop, a game console, a handheld computing device, a personal digital assistant, a digital camera, a set-top box, a multi-media player, a audio/video recording device, and so forth.

Processor 104 may be any processor suitable to perform operations in flash memory 106 including but not limited to a microprocessor, a digital signal processor, a controller, and so forth. Flash memory 106 is a nonvolatile memory device. For example, flash memory device 106 may be a memory device with memory cells having floating gate transistors. By storing varying amounts of charge on the floating gates of the transistors and thereby changing the threshold voltage, information may be stored in the memory cells. In some embodiments, a single bit of information may be stored in each cell, and in other embodiments, multiple bits of information may be stored in each cell. For example, in some embodiments, flash memory device 106 is a multi-level cell (MLC) flash memory device with the ability to store multiple different amounts of charge on floating gates, resulting in more than two storage states for each cell. NOR flash or any suitable flash technology may be employed.

In implementation, flash memory 106 incorporates a file system module 110 which represents functionality to maintain a file system 112 in the flash memory 106. Although illustrated as a single module incorporated within the flash memory 106, the functionality represented by the file system module 110 may alternatively be implemented via a variety of modules which may be included with the flash memory 106, provided as stand alone modules, integrated with various components of electronic system 100, and/or combinations thereof. The file system 112 may hold a plurality of files along with information describing the files. Typically file data in file system 112 of flash memory 106 are separated into multiple fragments which may be stored in different locations within flash memory 106, such as in logical volumes of the file system 112, which may correspond to data blocks, sectors, and physical locations of the flash memory 106. The functionality represented by the file system module 110 may include but is not limited to allocating space in the file system 112 of flash memory 106; performing flash memory 106 reads and writes; fragmenting file data for a data write; generating headers for a data write; matching logical locations of data in the file system 112 to physical locations in the flash memory 106; reclaiming or erasing space in the memory 106; providing an interface for operation between the file system 112 and the processor 104, operating system, and/or processor based device; and so forth. Further, the file system module 110 may include functionality to perform header management techniques in which a header block is employed to cache headers associated with a data write and to compact the headers into one or more sectors of a data block, further discussion of which may be found in relation to FIGS. 2-4

In some embodiments, processor 104 may execute file system module 110 to maintain the file system 112 in flash memory 106. In an implementation, the processor 104 may also be incorporated with the flash memory 106, such as a controller which is dedicated to operation of the flash memory 106 and which maintains the file system 112. In other embodiments, processor 104 is not dedicated to the use of flash memory 106, and the processor 104 maintains file system 112 in flash memory 106 while also performing other system functions, such as executing a variety of application modules provided for use with the processor based device 102.

The processor 104 and flash memory 106 of the system 100 may also be coupled via the bus 108 to a variety of additional components to provide functionality associated with processor based device 102. For example, the processor based device 102 in FIG. 1 includes a memory 114, one or more input/output (I/O) devices 116, and a wireless interface 118. The memory 114 may be configured as random access memory and/or other types and combinations of memory such as dynamic random access memory (DRAM), hard disk memory, removable medium memory, and other types of computer-readable media. The I/O devices 116 for example may include a display, a camera, a cursor control device (e.g., mouse, arrow buttons, stylus and so forth), a keyboard, speakers, communication ports, and other devices configured for input/output of information in the electronic system 100 and/or flash memory 106. The wireless interface 118 is operable to connect the processor based device 102 to one or more wireless networks such as a cellular telephone network, a computer based data network, and so forth, such that network resources (e.g., service and content) are made available to the processor based device 102. A variety of other wired and wireless connections of a processor based device 102 suitable to access various network resources are also contemplated.

Processors are not limited by the materials from which they are formed or the processing mechanisms employed therein. For example, processor 104 may be comprised of semiconductor(s), transistors (e.g., electronic integrated circuits (ICs)), and/or a variety of other mechanisms. In such a context, processor-executable instructions may be electronically-executable instructions. For example, the processor 104 may execute one or more modules in response to inputs received from one or more input/output devices.

Generally, any of the functions described herein can be implemented using software, firmware, hardware (e.g., fixed logic circuitry), manual processing, or a combination of these implementations. The terms "module," "functionality," and "logic" as used herein generally represent software, hardware, firmware, or a combination of software, hardware, and firmware. In the case of a software implementation, the module, functionality, or logic represents program code that performs specified tasks when executed on a processor (e.g., processor 104). The program code can be stored in one or more computer readable memory devices, e.g., memory 114. The features of the header management techniques described herein are platform-independent, meaning that the techniques may be implemented on a variety of commercial computing platforms having a variety of processors.

Figure 2:
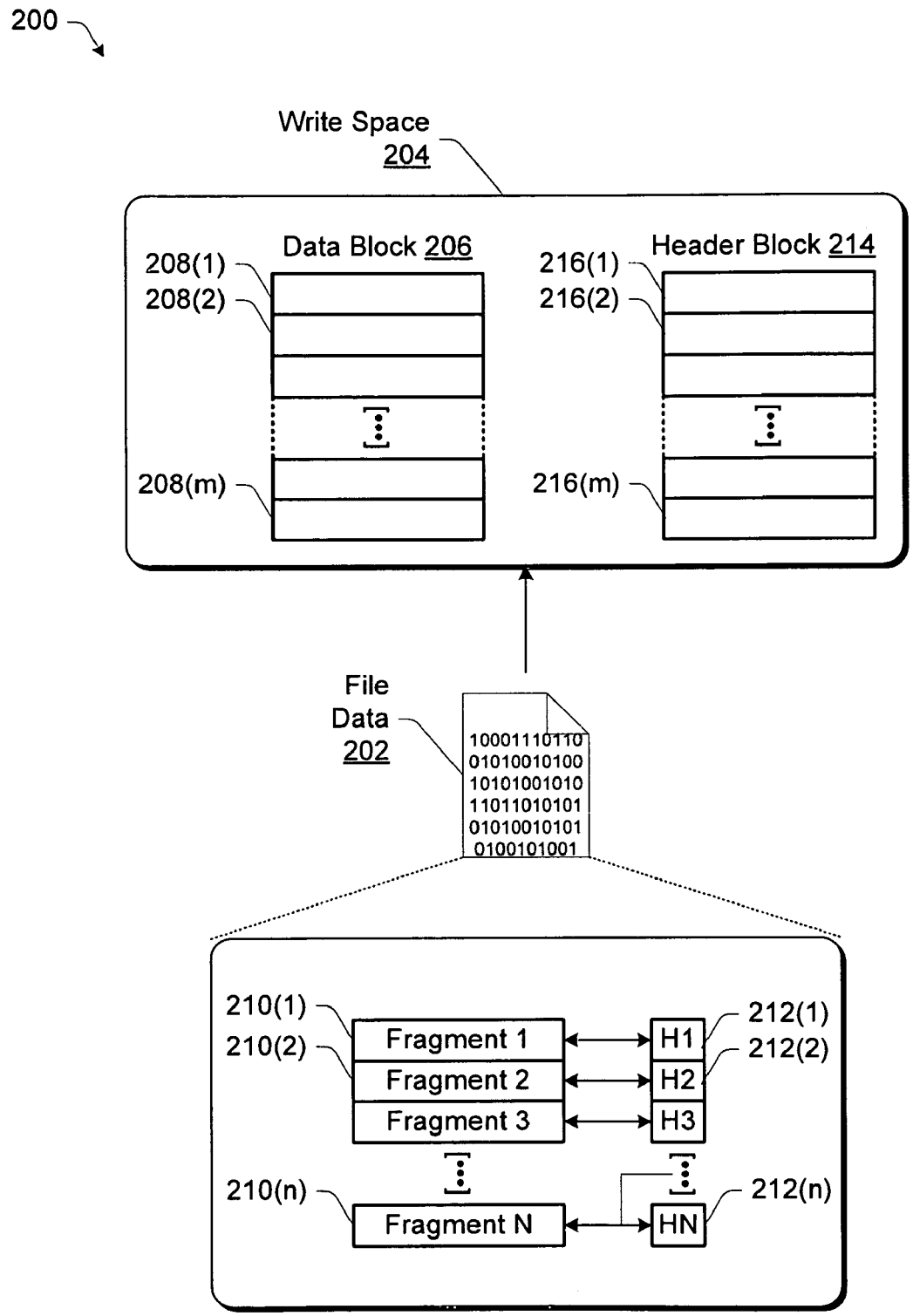
FIG. 2 depicts a exemplary implementation of file data and write space of a file system in which the file data may be written using the header management techniques described herein

Referring to FIG. 2, an exemplary implementation 200 is depicted that illustrates file data 202 and a portion of the flash memory 106 into which the file data 202 may be written. The depicted file data 202 may correspond to a variety of files from application modules, a file generated by user input via an input/output device 116, a file download via wireless interface 118 or other network interfaces, and so forth. The file data 202 may correspond to a complete file (e.g., an entire digital image) or a portion thereof (e.g., a portion of a complete digital image).

The file system module 110 may be executed by the processor 104 to store the file data 202 in flash memory 106 in accordance with the file system 112. More particularly, the file system module 110 may allocate write space 204 in the file system 112 to hold the file data 202 and perform the writing of the data to the file system 112 which it maintains in the flash memory 106. Those of skill in the art will appreciate that file data 202 is typically stored in a file system 112 of flash memory 106 as multiple fragments, which may be stored in different locations in the file system 112 that correspond to different physical locations in the memory. Each fragment has an associated header which is used to identify attributes of the respective fragment such as to which it file belongs, size, location in memory, sequence data to indicate where in the file the fragment belongs, status (e.g., valid, invalid, updating) and so forth. In an implementation, the file system module 110 generates the header associated with each respective fragment as the fragments are written to flash memory 106 or when file data 202 is updated. The file system 112 generally includes numerous data blocks which each include a plurality of smaller portions referred to as sectors into which the fragments are written. The fragment size for file data 202 may, in some embodiments correspond to the sector size of the data blocks in a file system. As an example, a data block may have 256 one kilobyte (kb) sectors and thus has a size of 256 kb. A 256 megabyte (mb) flash memory has roughly one thousand 256 kb data blocks which each may store 256 one kilobyte fragments of file data 202. A variety of other sizes for memory, blocks, sectors and/or fragments are also contemplated. A particular file may be stored in one or more data block of the flash memory 106 depending on the size of the file relative to the size of the data blocks.

In FIG. 2, the write space 204 includes a data block 206 which has a plurality of sectors 208(1), 208(2), [ . . . ], 208(m) where "m" may be any integer. The file data 202 in FIG. 2 is illustrated as separated into a plurality of fragments 210(1), 210(2), [ . . . ], 210(n) each of which has an associated header 212(1), 212(2), [ . . . ], 212(n) where "n" may be any integer. For example, fragment 210(1) is associated with header 212(1); fragment 210(2) is associated with header 212(2), and so forth. Usually, a fragment and a corresponding header are placed into the same data block to ensure that they will be updated together during reclaim operations. Reclaim operations may include removing invalid or empty sectors, consolidating free space in blocks and/or memory, copying data to spare block and so forth, such that the available free space in the memory may be arranged in relatively large and contiguous portions. The headers 212(1)-212(m) associated with file data are generally small compared to the sector size. For instance, each header may include a few bytes to indicate attributes of a respective fragment as compared to sectors which may be 1 kb or more. Thus, individual maintenance of headers in sectors of a data block may result in inefficient use of space in a memory 106. Accordingly, multiple headers may be consolidated into a single sector.

Header management techniques are described in which a header block 214 is used to temporarily store or "cache" headers during a data write to a flash memory. Thus, the allocated write space 204 may include both a data block 206 and the header block 214. In an implementation, the header block is used exclusively for caching of headers, e.g., the header block 214 is a dedicated or reserved block which is used for header management in data writes. Alternatively, a free data block may be used for data or as the header block 214. Thus, header block 214 may be a data block which is used for caching headers during a particular write. Like the data block 206, header block 214 has a plurality of sectors 216(1), 216(2), [ . . . ], 216(m) where "m" may be any integer. As illustrated the size of data block 206 and header block 214 is the same, although different sizes for different blocks are also contemplated. In operation, the file system module 110 may be executed to write file data 202 to the allocated write space 204, such that during the write each fragment 210(1)-210(n) is written to the data block 206 and each of the corresponding headers 212(1)-212(n) is written to the header block 206. Sectors of the data block 206 may also be left empty (reserved) for later storage of the headers. When the file data 202 has been written, the headers may be compacted from the header block 206 into the reserved sectors of the data block 206, with a single write to each sector. In other words, the write may be performed without bit twiddling. Thus, the "cached" header data in the header block 214 has now been duplicated and accordingly the entire header block 214 may be invalidated as it does not include file data. Therefore, the entire header block 214 may be reclaimed with a single reclaim operation and without copying of valid data to spare blocks, thereby resulting in an efficient reclaim.

The use of the header block 214 may significantly reduce the frequency of reclaim operations involved in filling a data block 206 and may also increase the efficiency of the reclaims which are performed. Accordingly, the described header management techniques may be used to minimize bit twiddling where available in order to improve reliability and lifespan of flash memory 106, while providing an efficient technique to store headers using a minimal amount of sectors. On the other hand, where bit twiddling is minimized or not available, the header management techniques described may be employed to reduce reclaim frequency as well as improve the efficiency of individual reclaims compared to alternate techniques.

For instance, assuming a 256 kb data block size and 1 kb sector size, then 128 fragments and corresponding headers may be initially stored during a direct data write to a data block, e.g., without bit twiddling. A reclaim of the data block may compact the 128 headers into a single sector, thus the result would be a data block with 129 used sectors and 127 free sectors. Then, 63 additional fragments and 63 corresponding headers may be written to the 127 free sectors freed up in the reclaim, and so on until the most efficient storage is reached. It may be appreciated that in this example, 8 block reclaims are used to fill a data block using the direct techniques. However, a single reclaim of the header block 214 may be involved through use of a designated header block 214 to cache the headers. Further, the reclaim of the header block 214 may have improved efficiency (e.g., performed in a lesser amount of time) because it contains invalid header data and may thus be entirely erased without copying data to spare blocks. Further discussion of techniques to utilize a header block 214 to temporarily store or "cache" headers during a data write may be found in relation to FIGS. 3-4 below.

Figure 3:
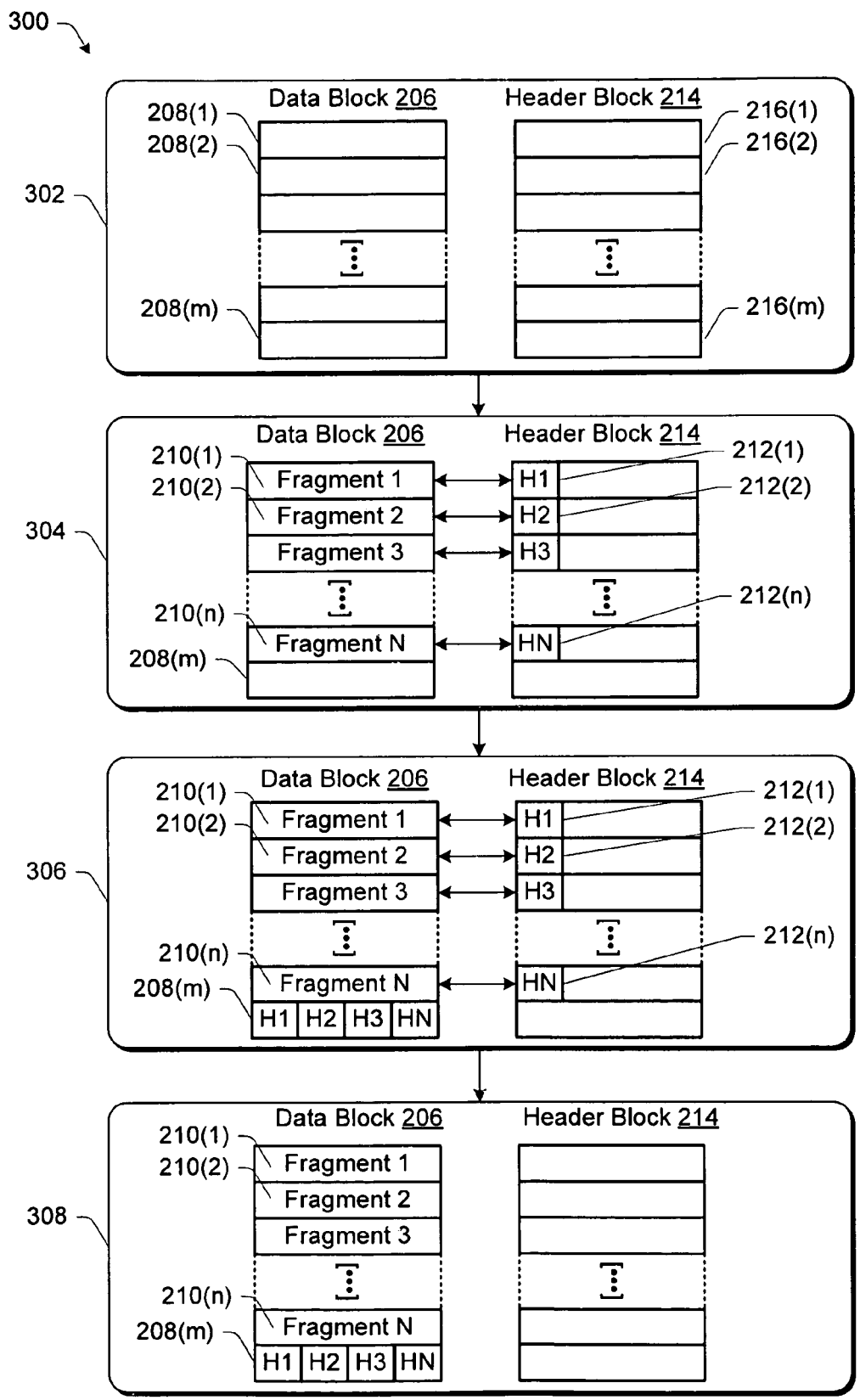
FIG. 3 depicts a sequence in an exemplary implementation in which a designated header block is utilized to cache headers in a write of file data to a data block of flash memory

FIG. 3. depicts a sequence in which file data is written to a flash memory utilizing a header block 214 to cache headers. In block 302, the space in memory 106 is allocated for a file data such as file 202 of FIG. 2, or other data. For instance, the file system module 110 may identify write space 204 for the file data 202. The allocated write space 204 includes a data block 206 to hold the data fragments and a header block 214 to temporarily store (cache) associated headers during the write. The data block 206 and header block 214 in this instance are initially empty.

In block 304, the file data 202 is illustrated as written into the allocated write space 204. In particular, each fragment 210(1)-210(n) has been written to a respective sector of the data block 206 and each corresponding header 212(1)-212(n) has been written to an individual sector of the header block 214. For instance, fragment 210(1) may be written to sector 208(1) of the data block and header 212(1) is written to sector 216(1) of the header block 206(1). This process repeats for each of the fragments 210(1)-210(n) and associated headers 212(1)-212(n). The amount of data (fragments) written to a data block may be controlled such that sufficient space (e.g., one or more sectors) remains empty (e.g., reserved) for headers written to the header block 214. Then the headers may subsequently be transferred from the header block to the reserved space in the data block 206. For instance, in block 304 sector 208(m) is not filled with a fragment during the write.

When each fragment and corresponding header of file data 202 has been written, the headers may then be compacted into the one or more open sectors of the data block 206. In block 306, the plurality of headers has been compacted into a portion which fits into one sector of the data block 206 and the compacted header portion has been written over to sector 208(m) of the data block 206. In particular, the compacted headers 212(1)-212(n) may be transferred with a single write to sector 208(m). In block 308, the header data in the header block 208 has been reclaimed, e.g., erased. A single reclaim may be used to erase the headers from the header block 214. The header block 214 is then ready to cache headers in another data write, or to be used for other purposes (e.g., data storage) in an embodiment in which the header block 214 may be used for purposes other than caching headers.

Exemplary Procedure

The following discussion describes header management techniques that may be implemented utilizing the previously described systems and devices. The procedures are shown as a set of blocks that specify operations performed by one or more devices and are not necessarily limited to the orders shown for performing the operations by the respective blocks.

Figure 4:
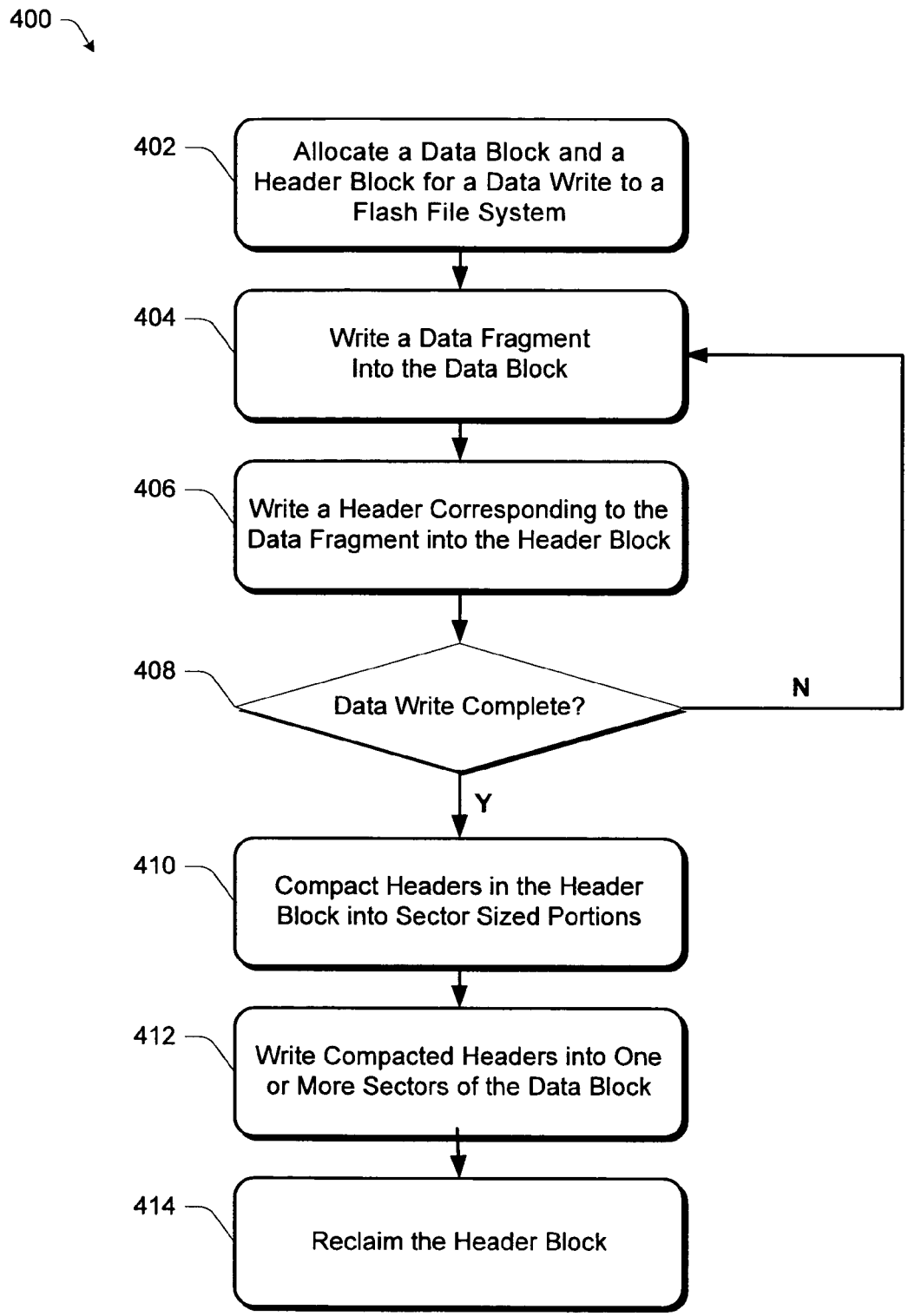
FIG. 4 is a flow diagram illustrating an exemplary procedure in which a designated header block is utilized to cache headers in a write of file data to a data block of flash memory.

FIG. 4 is a flow diagram that describes a procedure 400 in an exemplary environment in which a data write utilizing the header management techniques described herein is performed. A data block and a header block are allocated for a data write to a flash file system (block 402). A data fragment is written to the data block (block 404). A header corresponding to the data fragment is written into the header block (block 406). For instance, to write file data such as file 202 in FIG. 2 to flash memory 106, the file system module 110 of FIG. 1 may examine the file system 112 to find a data block 206 which has sufficient space for the file data. The data block 206 along with a header block 214 are allocated (e.g., designated) for the data write As previously noted, file data 202 associated with a data write may be divided into a plurality of fragments each having a corresponding header, as depicted in FIG. 2.

To efficiently write data to the data block, a header block 214 is utilized to temporarily store (cache) the headers during the write. In operation, a first fragment 210(1) is written and then the corresponding header 212(1) is written to the data block 206 and header block 214 respectively. The header 212(1), for example, may be generated by the file system module 110 in preprocessing, during the write and so forth. Naturally, file data 202 may represent one portion of a complete file which is written in several such portions to multiple data blocks like data block 206.

A determination is made whether the data write is complete (block 408). When the data write has not been completed (e.g., there is additional data to write), the procedure 400 loops back to blocks 406 and 408 for each fragment of data included in the data write. In this manner, each of a plurality of data fragments of file data may be written to the data block 206 and the corresponding headers written to the header block 214. When the data write has been complete, e.g., each data fragment and header for the write has been written, the headers in the header block are compacted into one or more sector sized portion (block 410).

In an implementation, the headers are arranged to occupy the least amount of space e.g., written in the least number of sectors. For instance, the headers may be sufficiently small to be compacted into a single sector sized portion (e.g., a portion that will fit in a single sector). Naturally, two or more sector sized portions may be used when a single sector is insufficient to hold the plurality of headers. The file system module 110 may calculate the number of sectors needed for headers and will reserve sufficient sector space for the header in the data block 206 during the write. Thus, if the block is 256 kb and two sectors will hold the headers, then the data write may involve 254 one kilobyte fragments of data. If the entire file consumes more than 254 kb, then the file may be spread across multiple data blocks.

In an implementation, the compacting includes forming one or more fragments of sector size or less which have a plurality of headers from the header block. For instance, the file system module 110 may be executed to form such fragments which may be held in random access memory (e.g., memory 114) of the system 100. Then, the one or more compacted header fragments may be written into one or more sectors of the data block (block 412). In this manner the headers 212(1)-212(m) may be transferred from the header block 214 into the data block 206. Thus, the header block 214 may be used during the data write to temporarily store or cache the headers associated with the write. Further, a plurality of headers may be written into a single sector of a data block 206 via a single write to the sector.

The header block is then reclaimed (block 414). For instance, once the compacted headers are copied to the data block 206, the header data in the header block 214 may be invalidated. Thus, valid file data is not written to and does not remain in the header block 214 once the headers have been compacted to the data block 206. Thus, the entire header block 214 may be erased without copying valid data from the block, such as to a spare block, which improves the efficiency of the reclaim operation.

CONCLUSION

Although the embodiments have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

What is claimed is:

1. An apparatus comprising:
 a file system to define a plurality of sectors of a flash memory; and
 a module wherein the module:
 designates a block of sectors of the flash memory as a data block, the data block stores a plurality of data fragments of a data file;
 designates a block of sectors of the flash memory as a header block, the header block caches a plurality of headers, each header associated with a respective one of the plurality of data fragments written to the plurality of sectors of the data block;
 writes each header to the header block, each header comprising attributes of the respective data fragment, wherein the attributes comprise:
 fragment sequence data; and
 an indication of the data file that is to include the respective data fragment; and
 writes the plurality of data fragments to the data block.

2. The apparatus as recited in claim 1, wherein the module is to compact the plurality of headers from the header block into a single section of the data block, such that the plurality of data fragments and the plurality of headers are stored in the data block in the flash memory.

3. The apparatus as recited in claim 2, wherein the plurality of headers is to be compacted to the data block via a single write.

4. The apparatus as recited in claim 1, wherein the module is to reserve a single sector in the data block during the write of the plurality of data fragments such that the plurality of headers cached in the header block are transferable to the reserved single sector of the data block.

5. The apparatus as recited in claim 1, wherein the module is to:
 compact the plurality of headers cached in the header block into the data block; and
 perform a reclaim of the header block to prepare the header block to use in another data write.

6. The apparatus as recited in claim 1, wherein the module is to write the plurality of headers cached in the header block into sectors of the data block without use of bit twiddling.

7. The apparatus as recited in claim 1, wherein the module is to write the plurality of headers cached in the header block into sectors of the data block without performance of a reclaim operation of the data block.

8. The apparatus as recited in claim 1, wherein each sector of the data block is configured for a single write before a reclaim of the data block.

9. The apparatus as in claim 1, wherein the file system and module are incorporated with the flash memory.

10. The apparatus as in claim 1, wherein the flash memory is NOR flash memory.

11. The apparatus as recited in claim 1 further comprising:
 the flash memory; and
 an input/output (I/O) device communicatively coupled to the flash memory to input/output data stored via the flash memory.

12. The apparatus as recited in claim 11, wherein the input/output (I/O) device is a cursor control device.

13. A method comprising:
 allocating a data block and a header block in a file system of a flash memory to perform a write of file data into the flash memory;
 caching a plurality of headers associated with the file data utilizing the header block, each header comprising attributes of a respective file data fragment, wherein the attributes comprise:
 fragment sequence data; and
 an indication of a data file, which corresponds to the file data, that is to include a the respective file data fragment; and
 compacting the headers from the header block into the data block.

14. A method as recited in claim 13 further comprising reclaiming the header block after the headers have been compacted to the data block.

15. A method as recited in claim 13, wherein: the data block comprises a plurality of sectors; and
 the compacting comprises forming the plurality of headers cached in the header block into one or more portions and writing the one or more portions into one or more sectors of the data block.

16. A method as recited in claim 13, wherein the caching of the plurality of headers in the header block is performed without bit twiddling.

17. A method as recited in claim 13 further comprising writing the file data to the data block as a plurality of data fragments wherein:

each of the plurality of headers corresponds to a respective one of the plurality of fragments;

the header block and data block each comprise a plurality of sectors; and for each of the plurality of data file fragments:

a fragment is written to a single sector of the data block; and a corresponding header is cached in a single sector of the header block.

* * * * *